United States Patent [19]
Seifert et al.

[11] Patent Number: 5,161,682
[45] Date of Patent: Nov. 10, 1992

[54] MULTI-SECTIONAL STORAGE RECEPTACLE

[75] Inventors: Josef Seifert, Grosselfingen; Josef Kurz, Haigerloch-Owingen, both of Fed. Rep. of Germany

[73] Assignee: Kurz Kunststoffe GmbH & Co., Owingen, Fed. Rep. of Germany

[21] Appl. No.: 602,422

[22] Filed: Oct. 22, 1990

[30] Foreign Application Priority Data

Apr. 12, 1990 [DE] Fed. Rep. of Germany ....... 4011920

[51] Int. Cl.$^5$ ............................................. B65D 85/57
[52] U.S. Cl. ................................... 206/309; 206/425; 206/444; 211/40
[58] Field of Search ............... 206/44 B, 45, 309, 312, 206/425, 444, 494, 387; 211/40, 195, 200, 201; 190/21, 103, 110

[56] References Cited

U.S. PATENT DOCUMENTS

| | | | |
|---|---|---|---|
| 2,261,806 | 11/1941 | Hills | 206/309 |
| 2,333,798 | 11/1943 | Kner | 206/312 |
| 4,444,314 | 4/1984 | Jacobsson | 206/45 |
| 4,538,730 | 9/1985 | Wu | 206/44 B |
| 4,589,544 | 5/1986 | Schweinsberg | 206/45 |
| 4,730,727 | 3/1988 | Petroff | 206/425 |
| 4,762,225 | 8/1988 | Henkel | 206/309 |
| 4,765,469 | 8/1988 | Seifert | 206/309 |
| 4,778,047 | 10/1988 | Lay | 206/44 B |
| 4,781,292 | 11/1988 | Sacherman et al. | 206/425 |
| 4,817,792 | 4/1989 | Seifert | 211/40 |
| 4,871,066 | 10/1989 | LaWall | 206/459 |
| 4,871,218 | 10/1989 | Swinson | 206/425 |

Primary Examiner—David T. Fidei
Attorney, Agent, or Firm—Darby & Darby

[57] ABSTRACT

In connection with a multi-sectional storage receptacle for a plurality of plate-shaped record supports (floppy discs), accommodated in individual stiff partitions, which form a stack in the closed condition of the storage receptacle and are spread apart during the opening process, via their articulated connection elements, it is proposed to form the connection elements, which preferably have the form of flat connection bars, integrally with the partitions, connecting them to the latter on both sides via film joints, and to provide an additional joint at the middle of each connection element, by which the connection elements are folded back against themselves in the closed condition of the receptacle and which allow the storage receptacle to be displayed, in its open condition, in any spread-apart, stepped or rosette-like arrangement.

10 Claims, 5 Drawing Sheets

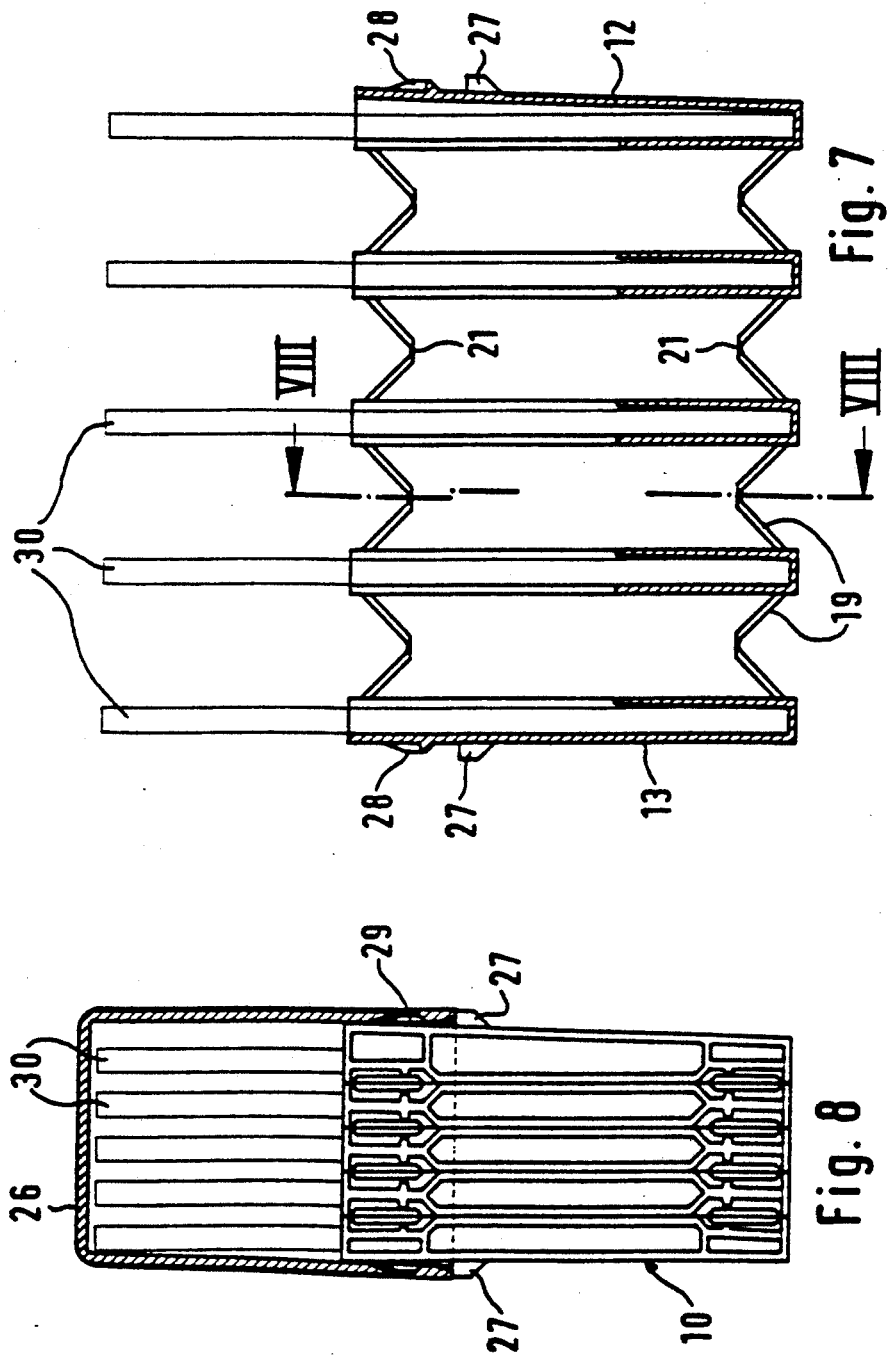

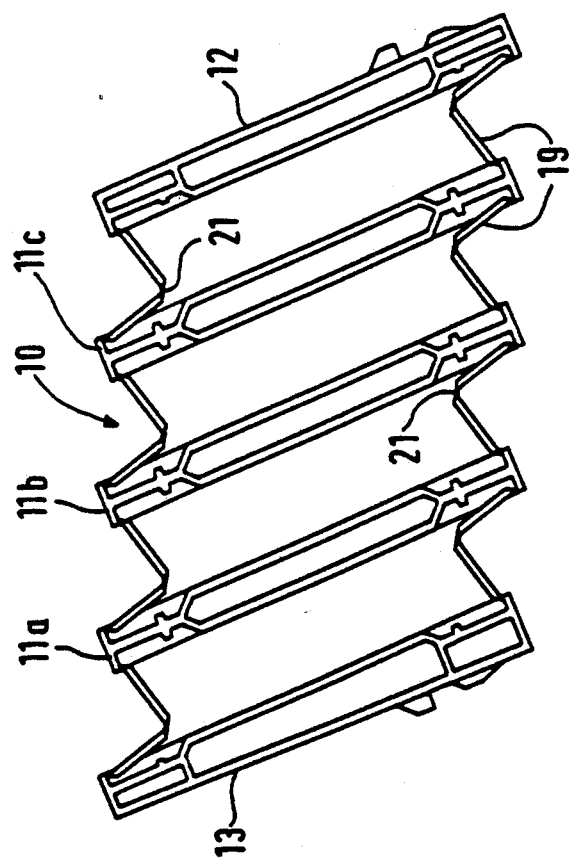

MULTI-SECTIONAL STORAGE RECEPTACLE

BACKGROUND OF THE INVENTION

The present invention relates to a multi-sectional storage receptacle according to the preamble of claim 1 and is concerned, in particular, with the possibility to accommodate plate-shaped record supports in a plurality of interconnected stiff partitions in such a way that when the storage receptacle is opened, in the sense of pulling open the individual partitions, the record supports accommodated in the latter become readily visible.

In the case of a known multi-sectional storage receptacle of the type described above (DE 86 02 838 U1, DE-PS 36 03 383), the individual plate-shaped record supports are accommodated in individual stiff partitions forming a stack in the closed condition. The individual partitions, forming each a pocket, are interconnected with the aid of connection elements of a first type in such a way that during the opening process, the connection elements form a parallelogram guide, causing the partitions with their intermediate sections to spread open, which enables the stack to be pulled out, in a concertina-like manner, so that the partitions are arranged in parallel and at a certain spacing relative to each other. The arrangement is such that at least two connection elements are arranged to pivot about two parallel pins on the adjacent surfaces of each pair of neighboring partitions.

This arrangement provides in fact a direct view of, and the possibility to identify all objects, such as record supports or individual cassettes, that are stored in the different partitions of the multi-sectional storage receptacle, the storage space required being considerably reduced as the multi-sectional storage receptacle is closed. However, it cannot be excluded that the production of such a multi-sectional storage receptacle is complicated and that due to the parallelogram guide the partitions can be pulled open only in a concertina-like manner and only in one predetermined direction, which makes the whole arrangement somewhat stiff.

Another known multi-sectional storage receptacle, that serves for accommodating disk-shaped record supports (DE 32 47 796 A1) comprises a box-shaped housing with a slide that can be pulled out in the manner of drawers. The slide has a frame-shaped design and a front panel which closes the housing completely, and plate-shaped holders disposed on the slide are pivoted on one side in such a manner that when the slide is pulled out to the position in which the plate-shaped record supports can be withdrawn, the individual holders will spread apart in the form of a rosette, so that all of them project from their pivot points at the slide in a fan-like manner. While it is in fact possible in this manner for the record supports to be withdrawn individually from the open receptacle, the partitions or holders accommodating the record supports are still held in contact with one another along one side so that only a small portion of label surfaces, legends or the like, for example, can be rendered visible in the withdrawal position, as reading from the side is rather difficult and as in the normal reading or withdrawal position the individual holders, while being spread apart, still overlap each other. In addition, the known storage device is of complex design and necessitates in any case a separate housing, as the individual partitions can be folded together to a stack, and can be spread apart, respectively, only by the action of the housing in conjunction with the slide.

It has further been known, in connection with a receptacle for magnetic tape cassettes (DE 26 09 881 A1) to dispose a plurality of partition-forming drawers in the receptacle in such a way that on the one hand they can be pulled out for withdrawal of the record support accommodated therein, while on the other hand they are protected from being pulled out completely in such a way that each of them is supported, in its extreme opening position, on a front edge of the container in a downwardly inclined position, which means that while being united to a compact magazine by suitable connection means, namely the encompassing housing, the individual receptacles for the record supports in the magazine cannot be spread apart.

Generally, it has been known for a multi-sectional storage receptacle composed of flat partitions or receiving pockets, to be united at its lower end by means embracing all partitions, while its other end can be spread open or folded open, for example in the manner closed Chinese lanterns are opened, whereby the individual receptacle pockets, arranged in a circle and tapering downwardly and inwardly, are opened and rendered accessible. Such a receptacle provides, however, the disadvantage that it is essentially suited only for accommodating very thin objects, such as sheets of paper, while it is not possible to accommodate objects like boxes, for example, these having the same thickness throughout their height which would make it impossible for such a rosette-like receptacle to be closed.

It has also been known to arrange and to store in stacks certain plate-shaped objects, such as so-called floppy disks for calculators or computers. If, however, a given floppy disk is to be withdrawn, then the whole stack of available floppy disks or other storage means, which may for example also be so-called CD-ROM boxes, has to be leafed through manually with the storage means known heretofore, as the legends on the disks can be read, and the right storage disk can be selected only if the receptacles are opened or, in any case, if other receptacles arranged on top of them are removed.

Now, it is the object of the present invention to provide a multi-sectional storage receptacle of the type described at the outset which can be produced in a simplified way, if possible by a single extrusion operation, and which offers much greater flexibility regarding its handling, while maintaining the stiff, linked-together partitions.

ADVANTAGES OF THE INVENTION

The invention solves this object with the aid of the characterizing features of claim 1 and provides the advantage that the third, central film joint makes each of the connection elements, that connect the stiff partitions to a single piece, particularly flexible, while simplifying the overall structure, and provides the advantageous possibility that the individual partitions can either be pulled apart in concertina-like manner, or opened in the form of a rosette so that the lower ends remain together, while the upper ends of the partitions are spread apart the greatest possible distance.

It is a further advantage of this arrangement that the connection elements, which as such as folded together about the third joint, do not project beyond the outside of the receptacle, but will fold inwardly thereof and be accommodated in recesses provided in the marginal areas of the receptacle so that the individual partitions can be stacked on top of one another in such a way that the total dimension of the stack is equal to the sum of the height or thickness dimensions of the individual partitions, without the total thickness being increased additionally by the connection elements.

Other features and improvements of the invention are the subject of the sub-claims, and are specified therein.

If the multi-sectional storage receptacle is produced from a suitable plastic material as one piece, by means of a single extrusion process, then only one additional closing element will be required, preferably in the form of a covering cap which can be placed over the entire arrangement of partitions, and which then simultaneously serves to hold together the multi-sectional storage receptacle, and to protect its contents. When the cap is removed, the individual partitions will automatically be spread apart a certain degree, due to the film joints of the connection elements.

BRIEF DESCRIPTION OF THE DRAWING

Certain embodiments of the invention will now be described in more detail with reference to the drawing in which:

FIG. 6 shows a top view of the multi-sectional storage receptacle illustrated in the before-mentioned figures, while FIG. 7 shows a sectional view, corresponding to that of FIG. 4, of the multi-sectional storage receptacle in the extended condition, with the information carriers accommodated in the different partitions being indicated diagrammatically;

FIG. 8 shows a sectional view taken along line VIII—VIII in FIG. 7; and

FIG. 9 shows the multi-sectional storage receptacle according to the invention in a different, extended form, where the individual partitions occupy a laterally tilted position whereby the visibility of the legends on the information carriers in the partitions is improved.

DETAILED DESCRIPTION OF THE EMBODIMENTS OF THE INVENTION

Figure 1:
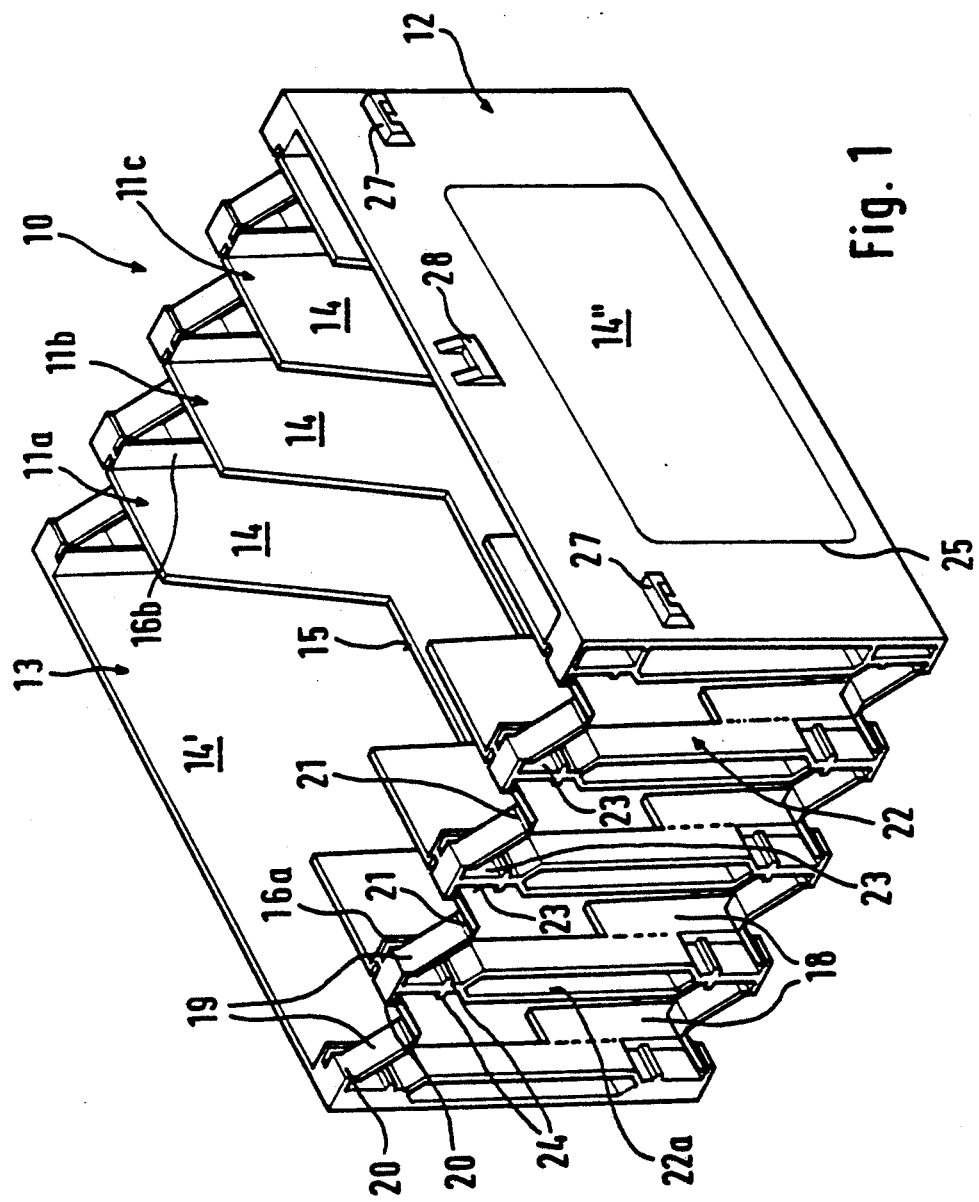
FIG. 1 shows a perspective view of one embodiment of the multi-sectional storage receptacle, with the covering cap removed.

The basic structure of the invention can be discussed best with reference to the perspective representation of FIG. 1. The multi-sectional storage receptacle 10 according to the invention comprises a predetermined number of inner partitions 11a, 11b, 11c, and a front-end partition 12, as well as a rear-end partition 13, the terms front-end and rear-end being of course dependent on the observer's position, so that they are not to be understood as limiting the invention.

Each of the partitions comprises a fully or partly closed front or rear panel. Viewed in the perspective of FIG. 1, the inner partitions 11a, 11b, 11c . . . are provided with rear panels 14, from which a greater or smaller section 15 may be cut out, for reasons of material savings. Each rear panel is followed on both sides by side panels 16a, 16b, formed as a single piece with the rear panel and having a width adapted to the predetermined thickness of the record supports or information carriers to be accommodated, such as floppy discs, CD discs, maybe even with their individual protective boxes, or the like.

Generally, there is no fixed rule as regards the number of partitions or the type and structure of the plate-shaped object to be accommodated therein — which will be referred to hereafter as floppy disc.

Figure 6:
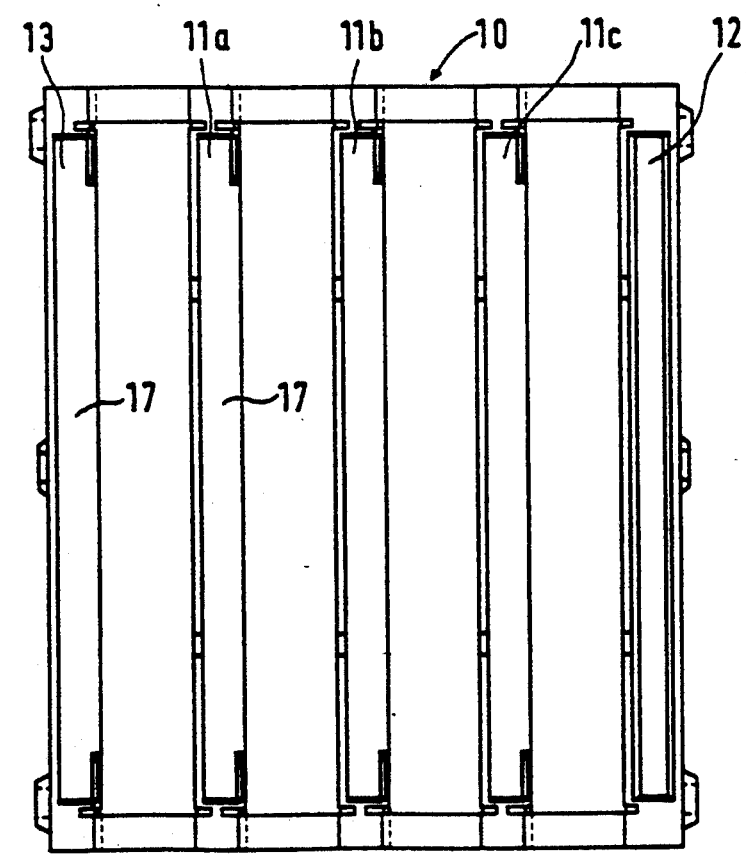

Each of the partitions is open on top, as shown in FIG. 1, but provided with a bottom panel 17 which forms the continuation of the side panels 16a, 16b and which can be seen best in the top view of FIG. 6. This bottom panel 17, and partial surfaces 18 projecting inwardly from the forward edges of the side panels 16a, 16b and forming parts of a front panel preferably only at this point, complete the receiving space of each of the partitions 11a, 11b . . . 12 and 13. The very narrow partial front panels 18 of each partition only serve to prevent the information carriers or floppy discs contained in the partitions from dropping out in forward direction (always viewed in the direction of the perspective view of FIG. 1), in the extended condition of the multi-sectional storage receptacle, while in the folded-together condition the floppy discs contained in the receptacle are anyway held by the rear panel of the next partition adjacent the forward edge of the respective partition.

It goes without saying that the structure of the individual partitions described heretofore may be modified and changed in many different ways, in particular as regards the design of the individual partial wall panels, the rear panels and the side panels, without departing from the general concept of the invention.

An essential feature of the invention is seen in the fact that the individual partitions 11a, 11b, 11c . . . 12, 13 are interconnected by connection elements 19 so as to adhere to each other. The connection elements are provided at the top and at the bottom of each side of the multi-sectional storage receptacle so that in the illustrated embodiment each of the inner partitions 11a, 11b, 11c is equipped with connection elements at the front and at the rear, the top and the bottom of each side, i.e. a total of eight elements, while the front and rear partitions are of course only equipped with a total of four such connection elements 19 each, at the side of the respective adjacent partition, as will be readily appreciated.

The connection elements are sort of flat bars which are fixed to the partitions via film joints 20 and which are further provided with an additional middle joint 21 which contributes very essentially to giving the multi-sectional storage receptacle its high flexibility and versatility.

It is understood that the respective connection elements 19 are located on both sides outside the receiving space of the partition, which means that they are fixed laterally outwardly thereof, so that it is ensured that when all partitions are folded together to the form shown, for example, in FIG. 8, the connection elements 19, which are folded together in this position due to the middle joint 21, will not increase the thickness of the entire receptacle.

It is for this purpose that projections 22 having a width corresponding approximately to the width of the individual flat connection bars with their three joints, are provided on the marginal edges of all partitions.

In the case of the illustrated embodiment, the before-mentioned flat connection bars are fixed on the lateral projections at the top and at the bottom, via the before-mentioned film joints 20 (by a single extrusion process), and the lateral projections are provided, in the area of the flat connection bars forming the connection elements 19, with recesses 23 disposed on both sides, i.e. towards the front and towards the rear, for accommodating the flat connection bars when the latter are folded together. During this latter process, the flat connection bars fold down about themselves, due to the middle joint 21, so that the middle film joints 21, i.e. the middle joints of connection elements arranged on the same side, are directed towards each other, and will not project outwardly beyond the contours of the multi-sectional storage receptacle. The receiving recesses 23 may then be additionally provided with side pieces 24 projecting from both sides for retaining the parts of the flat connection bars, which have been folded inwardly on both sides, in a centered middle position.

The lateral projections 22 may also be provided, in their central areas, with a correspondingly big recess 22a, for example if this should be desired for reasons of material savings or to give the unit an attractive appearance.

Figure 2:
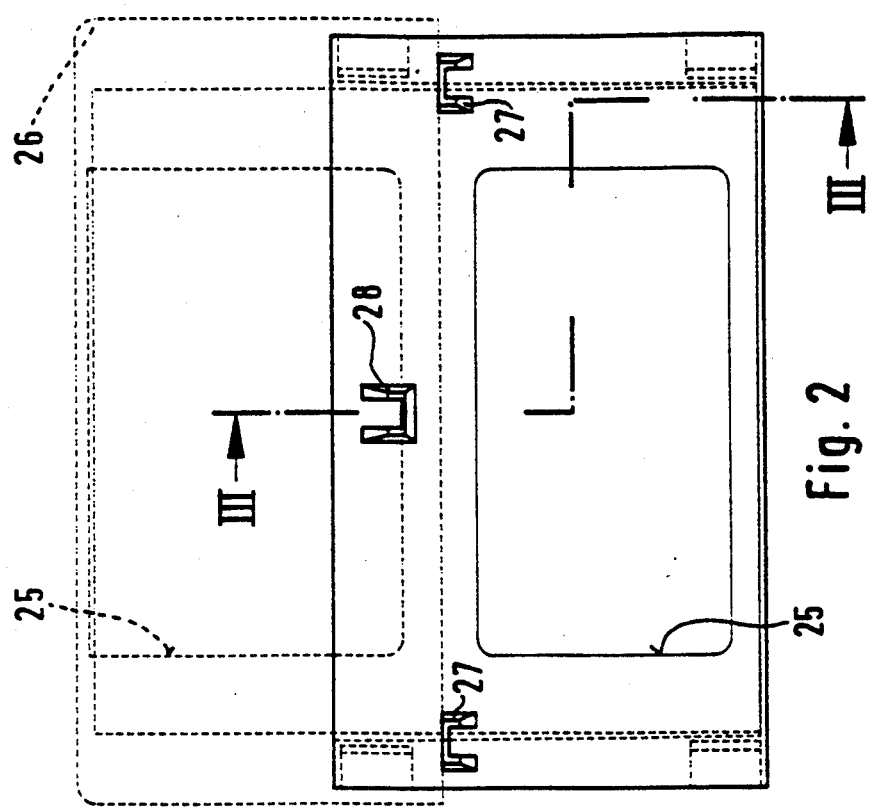
FIG. 2 is a front view of the multi-sectional storage receptacle of FIG. 1, with the covering cap indicated by dashed lines.

It goes without saying that in order to give the multi-sectional storage receptacle closed front and rear panels, the outer panels of the front partition 12 and of the rear partition 13 and, consequently, the partitions themselves, have a somewhat different design. In the case of the rear partition 13, as illustrated in FIG. 1, the difference consists only in that the rear panel 14' is of continuous design, i.e. not provided with the recess 15, while in the case of the front partition the rear portion is designed identically to that of each of the inner partitions 11a, 11b, etc., whereas the very small partial front panels 18 of the inner partitions are developed, in the case of the front partition, to a complete closed front panel 14" closing the multi-sectional storage receptacle on this side. The dashed contours appearing in the figures and denoted generally by reference numeral 25 (see also FIG. 2) are no recesses, but rather surfaces marked by the extrusion process, which may be used for example for applying labels, tags or the like.

Figure 3:
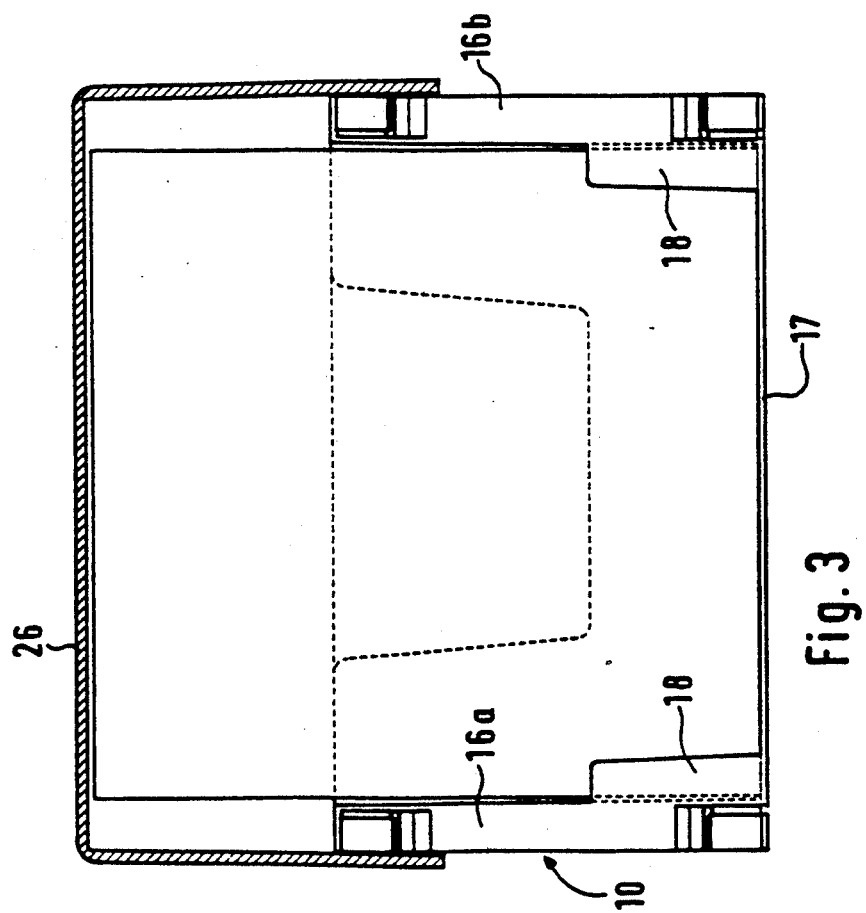
FIG. 3 shows a sectional view taken along line III—III in FIG. 2.

A multi-sectional storage receptacle designed in this manner is then closed advantageously by an upper covering cap 26 (see FIG. 3 or 8, for example) in box-like, downwardly open form which is placed over the closed partitions with the floppy discs arranged therein. For this purpose, additional stops 27 are provided on the front and rear panels of the outer partitions 12 and 13, which serve as support for the edges of the covering cap 26, while a central projection 28, likewise provided on the front and rear panel of the outer partitions, may engage a recess 29 in the covering cap to lock the latter in its position on the multi-sectional storage receptacle. This holds the storage box so formed together and keeps it closed dust-tight. The dust-tight closure is further ensured by the fact that in the closed condition of the unit, the outer edges of the lateral projections 22 extend closely adjacent to one another and that in the areas where the recesses 23 are formed for receiving the folded-in flat connection bars the side panels 16a, 16b extend right up to the top where they rest against the adjacent rear surfaces. One obtains in this manner a fully enclosed interior composed of the different partition cavities.

The representation of FIG. 7 illustrates further the way in which the different record supports, especially floppy discs 30, are received in the partitions and are clearly displayed for visual inspection in the extended condition of the partitions. In this connection, it appears from FIG. 9 that the special design of the joints of the individual connection elements makes it possible, basically, to give the storage receptacle any desired configuration in its extended position, including one, where the individual partitions are displayed in a spread-apart and inclined arrangement so tnat any legends or labels on the floppy discs can be readily seen.

Given the universal flexibility of the three-joint connection elements, such a storage receptacle can of course also be opened in rosette-like manner, i.e. kept completely closed at the bottom, while its top is folded open in the manner of a Chinese lantern.

Figure 4:
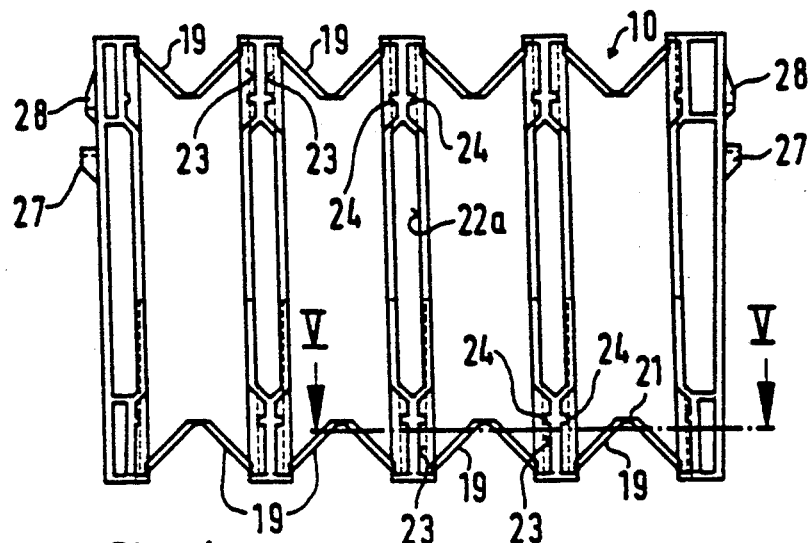
FIG. 4 shows a side view of the multi-sectional storage receptacle in one possible spread-apart, pulled-out form, with the connection elements partly unfolded.
Figure 5:
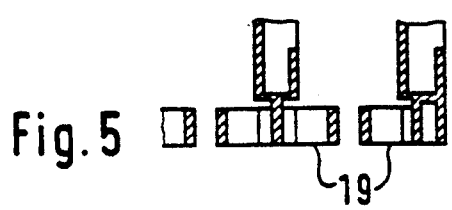
FIG. 5 shows a sectional view taken along line V—V in FIG. 4.

The way in which the individual connection elements 19 fold together about their middle joint 21 is illustrated particularly clearly in the representation of FIG. 4, regarded in conjunction with the sectional view of FIG. 5. FIG. 4 shows the recesses extending inwardly from the area of the pivot point of the respective film joint and intended for receiving the respective partial connection bar, as well as the stop formed for the partial bars in the said recesses by the projections 24 disposed on both sides.

It is understood that all features that can be derived from the specification, the claims and the drawing may be essential to the invention individually, and also in any combination thereof.

We claim:

1. A multi-sectional storage receptacle for a plurality of plate-shaped records, comprising:
   a protective housing;
   a plurality of separate partitions located in said protective housing for storing a respective plurality of record supports;
   a plurality of articulated connection elements for connecting said partitions with each other, each of said articulated connection elements having intermediate the ends thereof an articulated joint enabling folding of each articulated element on itself whereby said partitions are movable between a closed condition in which said partitions are stacked against each other, and an extended position in which said partitions are spaced from each other, each of said partitions being provided, at opposite ends thereof, with respective articulated connection elements formed integrally therewith;
   means for connecting said articulated connection elements to respective ones of said plurality of partitions; and
   a covering downwardly opening cap for enclosing the entirety of said partitions and protecting an upper area of said partitions in said closed condition;
   said plurality of partitions including two outer partitions defining complete continuous front and rear wall panels of said receptacle, and a plurality of inner partitions, one of said front and rear wall panels carrying stops for said covering cap, the front wall panel having a partial front panel forming an end panel of said receptacle, each of said inner partitions having a partial rear panel, two side panels and a marginal partial front panel.

2. A multi-sectional receptacle as set forth in claim 1 wherein said covering cap has a plurality of inner recesses, said front and rear wall panels having lugs thereon for engaging said inner recesses of said covering caps.

3. A multi-sectional storage receptacle for a plurality of plate-shaped records, comprising:
- a plurality of separate partitions each having a top opening for receiving at least a respective one of a plurality of records through said top opening for storing the record therein;
- each of said partitions having an upper edge adjacent the top opening and a lower edge; and
- a plurality of upper and lower articulated connection elements of substantially the same length for connecting said partitions with each other adjacent said upper and lower edges, each of said upper and lower articulated elements having opposite ends which are connected to adjacent partitions, and a fold line intermediate said opposite ends and about which the articulated connection element is adapted to fold flat, inwardly of said upper and lower edges, whereby said partitions are movable between an extended position in which said partitions are spaced from each other, and a closed position in which said partitions are stacked against each other and said connection elements are sandwiched therebetween.

4. A multi-sectional storage receptacle for a plurality of plate-shaped record supports, comprising:
- a plurality of separate partitions for storing a respective plurality of records and each having upper and lower edges; and
- a plurality of upper and lower articulated connection elements of substantially the same length for collapsably connecting said partitions with each other at said upper and lower edges, each of said upper and lower articulated connection elements having opposite ends which are connected to adjacent partitions, and a fold line intermediate said opposite ends and about which the articulated connection element folds flat, inwardly of said upper and lower edges, said partitions having recesses at the upper and lower edges thereof for receiving respective portions of respective upper and lower articulated connection elements in a collapsed position of said storage receptacle so that said partitions are in face-to-face contact with each other in said collapsed position.

5. A storage receptacle as set forth in claim 3 wherein pivot points of upper articulated connection elements and pivot points of lower articulated connection elements connecting adjacent partitions are located at the same heights, respectively, on said adjacent partitions.

6. A storage receptacle as set forth in claim 3 wherein respective articulated connection elements are disposed laterally outwardly of a record receiving space of a respective partition.

7. A multi-sectional storage receptacle for a plurality of plate-shaped records, comprising:
- a plurality of separate partitions for storing a respective plurality of records and having each upper and lower edges; and
- a plurality of upper and lower articulated connection elements of substantially the same length for connecting said partitions with each other adjacent said upper and lower edges, each of said upper and lower articulated connection elements having opposite ends which are connected to adjacent partitions, and a fold line intermediate said opposite ends and about which the articulated connection element is adapted to fold flat, inwardly of said upper and lower edges, whereby said partitions are movable between an extended position in which said partitions are spaced from each other, and a closed partition in which said partitions are stacked against each other and said connection elements are received therebetween;
- each of said partitions having a record receiving portion and two lateral projections extending from upper and lower ends of said receiving portion and defining the upper and lower edges of the partition, and upper and lower recesses at said upper and lower edges for receiving respective portions of respective upper and lower articulated connection elements in the closed condition of the receptacle.

8. A storage receptacle as set forth in claim 7 wherein said plurality of partitions includes two outer partitions defining complete continuous front and rear wall panels of said storage receptacle, and a plurality of inner partitions each having a partial rear panel, two side panels located at opposite sides of said partial rear panel, and a marginal partial front panel spaced from said partial rear panel.

9. A storage receptacle as set forth in claim 8 wherein each of said partitions have at opposite side thereof outward lateral projections defining, in said closed condition, together with the side panels of the inner partitions and rear panels of the outer partitions, a substantially tight cavity divided by the inner partitions.

10. A storage receptacle as set forth in claim 9, further comprising a top covering cap for enclosing said partitions in the closed condition of said receptacle.

* * * * *